Sept. 29, 1964    I. L. GLERUM    3,151,303

MEASURING DEVICE TRANSDUCER

Filed March 2, 1962

INVENTOR.
IRVIN L. GLERUM
BY Elliott & Pastoriza
ATTORNEYS

United States Patent Office 3,151,303
Patented Sept. 29, 1964

3,151,303
MEASURING DEVICE TRANSDUCER
Irvin L. Glerum, Canoga Park, Calif., assignor to W. C. Dillon & Company, Inc., a corporation of California
Filed Mar. 2, 1962, Ser. No. 177,124
3 Claims. (Cl. 336—30)

This invention relates generally to measuring devices and more particularly to an improved transducer incorporating differential transformers.

This application is a continuation-in-part of my co-pending patent application Serial No. 65,644, filed October 28, 1960, now Patent No. 3,092,995, and entitled "Measuring Device."

In the above referred to co-pending application, there is disclosed a measuring device employing a differential transformer means for converting elongation or compression of a member into an electrical signal for indicating the distorting force applied. Alternatively, the circuit may be employed to indicate minute linear movements by converting the same into a proportional electrical reading. A differential transformer circuit with which the above-mentioned patent application and the present invention are concerned is disclosed in United States patent application Serial No. 765,593, filed October 6, 1958, now Patent No. 3,033,032, and entitled "Dynamometer."

A primary object of the present invention is to provide a measuring device incorporating an improved differential transformer means such that the reliability, accuracy, and sensitivity of the measuring instruments described in the above-mentioned co-pending applications are greatly increased.

More particularly, it is an object to provide an improved differential transformer arrangement incorporating novel armature means to increase the accuracy and sensitivity of the output signal without appreciably increasing the cost of parts or labor involved in assembling the transducer.

Briefly, these and other objects and advantages of this invention are attained by providing a novel armature structure for use with a differential transformer of the type described in the first above-mentioned co-pending application. More particularly, the armature itself is divided into first and second armature members separated by a dielectric member of given thickness. With this arrangement, one of the armature members is associated with one of the differential transformers and the second armature member is associated with the other differential transformer. The magnetic flux paths of the first and second transformers are thus isolated from each other by the dielectric member. Moreover, the proximity of the members to their respective transformers can be much more accurately controlled by controlling the thickness of the dielectric between the members. As a consequence of this more accurate positioning and the isolation of the respective generated fluxes by the first and second transformers, a greatly improved output signal insofar as accuracy and sensitivity are concerned is realized.

A better understanding of the invention will be had by referring to the preferred embodiment thereof as illustrated in the accompanying drawings, in which.

Figure 1:
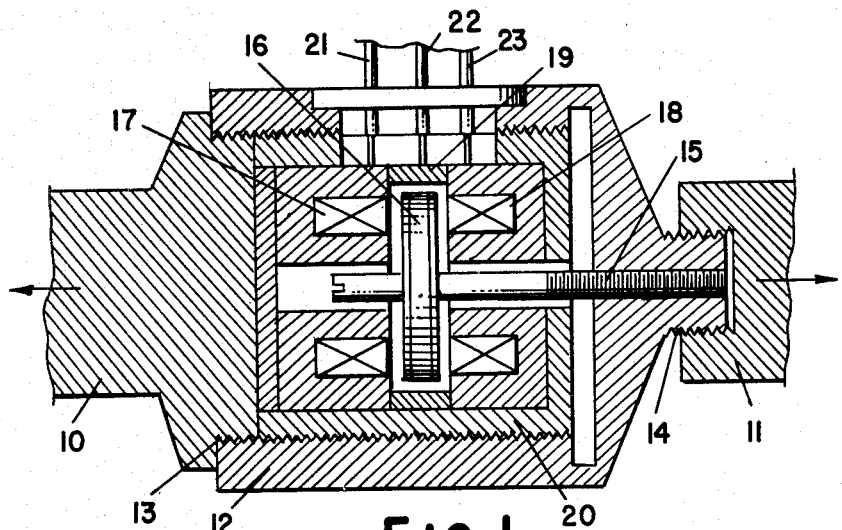
FIGURE 1 is a fragmentary view partly in cross section of a load cell structure such as shown and described in my first mentioned co-pending application Serial No. 65,644, filed October 28, 1960, and entitled "Measuring Device" wherein the load cell incorporates the improved armature structure in accordance with the present invention.

Referring first to FIGURE 1, there is illustrated generally a force measuring device including a first pull plug 10 and a second pull plug 11. These members are respectively coupled to a central load cell structure in the form of a cylindrical body 12. Thus, the plug member 10 is arranged to be threaded at 13 to internal threads in the cylindrical member 12 and the second pull plug 11 is arranged to thread to external threads on a boss structure as indicated at 14. The cylindrical body or load cell 12 is so designed that the degree of deformation thereof is a function of the force tending to pull the pull plugs 10 and 11 apart as indicated by the arrows or alternatively urge the same together in the event compression forces are to be measured.

To detect the above deformation, there is provided a shaft or stem structure 15 rigidly threaded within the right hand portion of the cylindrical body 12. This shaft extends axially within the cylindrical body 12 and supports an armature means 16. Armature means 16 is disposed between first and second transformer means 17 and 18. These transformer means are held in axially opposed spaced relationship by an indexing ring of given width indicated at 19.

As shown in FIGURE 1, both transformers 17 and 18 and the ring member 19 are rigidly secured within an externally threaded sleeve member 20 received within the cylindrical body 12. With this arrangement and when tension forces are applied to the pull plugs 10 and 11, deformation of the cylindrical body 12 will take place at the recessed slotted areas so that relative axial movement of the shaft 15 and thus armature 16 will take place relative to the first and second transformer means 17 and 18. As a consequence, there will result an inverse variation in flux in the first and second transformer means resulting in a similar variation in the output voltage to provide an electrical signal which is a function of the relative movement between the armature means 16 and the transformer windings. This output signal is derived from leads 21, 22, and 23.

The foregoing structure is essentially the same as that set forth and described in my referred to co-pending patent application Serial No. 65,644, filed October 28, 1960, for "Measuring Device," with the exception of the armature means 16. In the co-pending application, the armature means 16 constitutes a single disc structure formed from magnetic material. Thus, the magnetic material constituted a common flux carrier for the first and second transformer windings 17 and 18.

Figure 2:
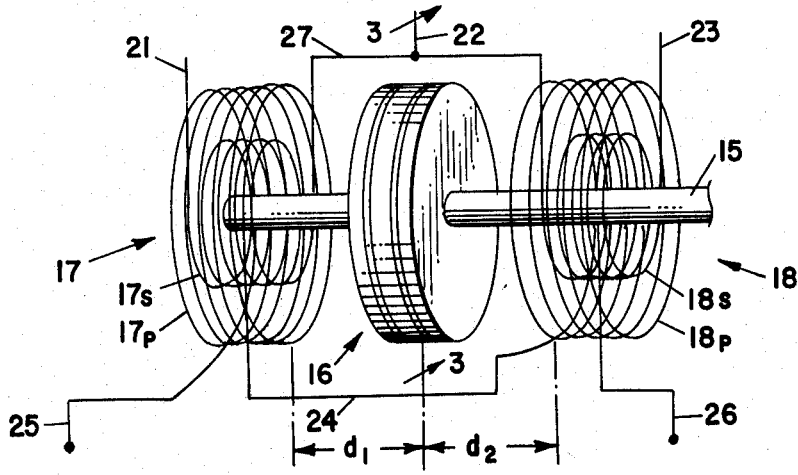
FIGURE 2 is a schematic perspective view of the basic components making up the differential transformer type transducer in accordance with the invention; and, FIGURE 3 is an enlarged fragmentary cross section of the armature structure itself taken in the direction of the arrows 3—3 of FIGURE 2.

Referring now to FIGURE 2, the manner in which the differential transformers are connected to provide a variable output signal in response to relative movement between the armature means 16 and the coils will become clear. As shown, the transformer means 17 comprises a transformer primary winding $17p$ wound co-axially on the same core with the transformer secondary winding $17s$. Similarly, the second transformer means 18 includes a primary winding $18p$ and secondary winding $18s$ also co-axially wound on the same core. The inner ends of the primary windings $17p$ and $18p$ are connected together as indicated by the lead 24 and the outer ends of these windings, respectively, connect at 25 and 26 to a suitable source of voltage. The inner ends of the secondary windings $17s$ and $18s$ in turn are also connected together as indicated by the lead 27. The outer leads of these secondary windings are indicated at 21 and 23 corresponding to the leads 21 and 23 shown in FIGURE 1.

A center tap lead 22 extending from the lead 27 corresponds to the similarly numbered lead in FIGURE 1.

When the central armature structure 16 is disposed mid-way between the coils 17 and 18 so that the indicated distances $d_1$ and $d_2$ shown in FIGURE 2 are equal, the output signals between the outer leads 21 and 23 and the central common lead 22 are exactly equal. When either a tension or compression force is applied to the pull plugs, there will result the relative movement between the armature structure 16 and the first and second transformer windings as described in conjunction with FIGURE 1, thereby resulting in an inverse variation in the flux generated by the two windings and a consequent variation in the output voltage.

Figure 3:
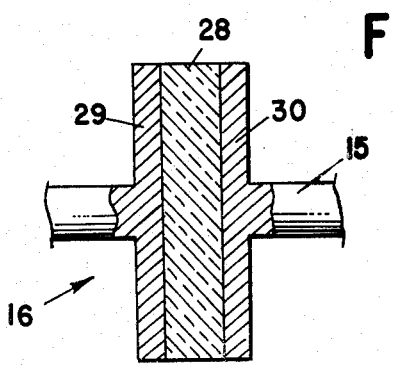

Referring now to the armature means 16 in detail as illustrated in the cross section of FIGURE 3, it will be noted that in accordance with the present invention, the armature includes a central dielectric member 28 and first and second members 29 and 30 made of magnetic materials and secured to opposite sides of the dielectric member 28. Preferably, all of the members are disc shaped as clear from the perspective view of FIGURE 2. The dielectric disc 28 serves to isolate the flux path of the first transformer windings from the second transformer windings. Also, the thickness of the dielectric 28 serves to space the respective magnetic flux carriers 29 and 30 closer to their respective transformer means so that excellent coupling is provided between the primary and secondary windings of the respective transformer means by the members 29 and 30. This degree of coupling will of course vary as the armature structure 16 is moved away from one of the transformer means and towards the other. For example, if it is moved from left to right as viewed in FIGURE 2, the member 30 of magnetic material will be moved closer to the primary and secondary windings 18p and 18s of the transformer means 18 so that the degree of coupling between the primary and secondary windings is enormously increased. Simultaneously, this movement will serve to move the member 29 of magnetic material further away from the primary and secondary windings 17p and 17s of the first transformer means 17 so that the degree of coupling between these coils is simultaneously greatly decreased. There is thus provided at the outputs a corresponding increase and decrease in the voltages measured between the common terminal lead 22 and the outside terminals 21 and 23.

From the foregoing description, it will be evident that the present invention has provided a unique armature means for a differential transformer of the type set forth in my co-pending patent applications. By this improved structure, considerably greater accuracy is realized in the output readings. It will be evident from the structure as described that substantially no appreciable modification is required of the particular load cell structure in order to incorporate the improved armature structure.

Minor modifications that fall clearly within the scope and spirit of this invention will occur to those skilled in the art. The improved measuring device is therefore not to be thought of as limited to the exact embodiment set forth merely for illustrative purposes.

What is claimed is:

1. In a measuring device, the combination including: first transformer means; second transformer means secured in a fixed relationship to said first transformer means, said transformer means each including coaxially wound primary and secondary windings, the primary and secondary windings of said first transformer means being in opposed spaced relationship with respect to the primary and secondary windings of said second transformer means; an armature means in flux coupling relationship with said first and second transformer means; and, supporting means for said armature means whereby movement of said supporting means will effect movement of said armature means relative to said first and second transformer means to cause an inverse variation in the magnetic flux of said first and second transformer means and a corresponding change in the output voltages of said first and second transformer means, said armature means comprising a central dielectric disc-shaped member and first and second disc-shaped members of magnetic material secured to either side of said central member, said armature means being axially positioned between said first and second transformer means, such that the magnetic flux generated by said first transformer means and passing through said first member is substantially isolated from the magnetic flux generated by said second transformer means and passing through said second member, and said supporting means comprising a shaft passing axially through one of said transformer means to connect to said armature means so that movement of said shaft brings one of said members closer to one of said transformer means and simultaneously moves the other of said members further from the other of said transformer means.

2. A device according to claim 1, including a first coupling means secured in fixed relationship to said first and second transformer means and a second coupling means secured to said supporting means whereby tension and compression forces applied to said first and second coupling means will result in relative movement between said armature means and said first and second transformer means to provide an output voltage variation indicative of said tension and compression forces.

3. A device according to claim 2, including a ring-shaped member axially positioned between said first and second transformer means and of a given width to index said first and second transformer means and hold the same in said fixed relationship relative to each other.

References Cited in the file of this patent

UNITED STATES PATENTS

| | | |
|---|---|---|
| 2,430,757 | Conrad et al. | Nov. 11, 1947 |
| 2,839,733 | Bassett | June 17, 1958 |
| 3,052,858 | Darlington | Sept. 4, 1962 |